United States Patent [19]

Nagasawa et al.

[11] Patent Number: 5,659,654
[45] Date of Patent: Aug. 19, 1997

[54] APPARATUS FOR RECORDING AND/OR REPRODUCING A VIDEO SIGNAL

[75] Inventors: Fumihiro Nagasawa, Kanagawa; Masaki Oguro, Tokyo, both of Japan

[73] Assignee: Sony Corporation, Tokyo, Japan

[21] Appl. No.: 300,704

[22] Filed: Sep. 2, 1994

[30] Foreign Application Priority Data

Sep. 6, 1993 [JP] Japan .................................. 5-245898

[51] Int. Cl.$^6$ ...................................................... H04N 9/79
[52] U.S. Cl. ................... 386/120; 386/31; 386/38
[58] Field of Search ........................... 358/310, 906, 358/909.1; 348/458; 386/1, 8, 31, 38, 101, 112, 120, 107, 117; H04N 9/79

[56] References Cited

U.S. PATENT DOCUMENTS

| 4,541,010 | 9/1985 | Alston ........................... 358/906 |
| 4,546,390 | 10/1985 | Konishi et al. . |
| 5,031,040 | 7/1991 | Maruyama ....................... 348/458 |
| 5,175,631 | 12/1992 | Juri et al. . |
| 5,212,742 | 5/1993 | Normile et al. . |

FOREIGN PATENT DOCUMENTS 0 439 132  7/1991  European Pat. Off. .

OTHER PUBLICATIONS

IEEE Transactions on Consumer Electronics, vol. 38, No. 3, Aug. 1992, New York US pp. 698-701, XP311913 Uchiyama et al. 'A digital still camera'.

Primary Examiner—Thai Tran
Assistant Examiner—Huy Nguyen
Attorney, Agent, or Firm—William S. Frommer; Alvin Sinderbrand

[57] ABSTRACT

An apparatus for recording and/or reproducing a video signal as a moving image or a still image. A moving image may be recorded in a first (YCrCb) recording mode wherein a luminance signal Y and color difference signals (R-Y) and (R-B) corresponding thereto are recorded. A still image may be recorded in a second (RGB) recording mode wherein three primary color signals corresponding thereto are recorded. In the RGB recording mode, the amount of information of each of the three primary color signals may be set to at least the amount of information of the luminance signal Y of the YCrCb recording mode such that, upon the reproduction thereof, a reproduced still image having a relatively high resolution is obtained.

12 Claims, 10 Drawing Sheets

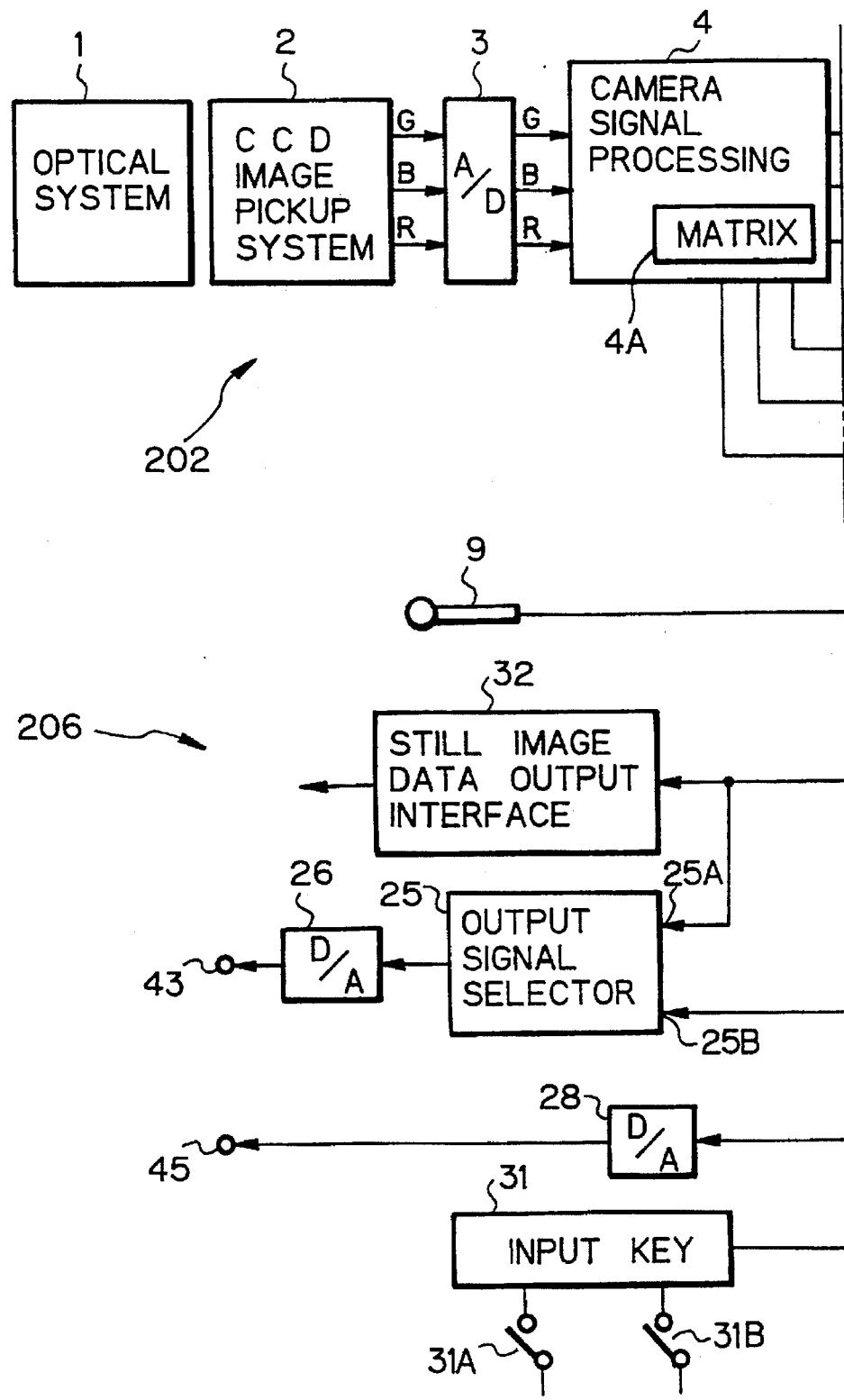

Fig. 10

| | MSB | | | | | | | LSB |
|---|---|---|---|---|---|---|---|---|
| PC 0 | 0 | 1 | 1 | 0 | 0 | 0 | 0 | 0 |
| PC 1 | TENS of TV CHANNEL | | | | UNITS of TV CHANNEL | | | |
| PC 2 | B/W | EN | CLF | | HUNDREDS of TV CHANNEL | | | |
| PC 3 | SOURCE CODE | | 50/60 | | STYPE | | | |
| PC 4 | TUNER CATEGORY | | | | | | | |

SOURCE

Fig. 11

| | MSB | | | | | | | LSB |
|---|---|---|---|---|---|---|---|---|
| PC 0 | 0 | 1 | 1 | 0 | 0 | 0 | 0 | 1 |
| PC 1 | RESERVED | | | | | | | |
| PC 2 | REC ST | 1 | REC MODE | | 1 | DISP | | |
| PC 3 | FF | FS | FC | IL | ST | SC | BCSYS | |
| PC 4 | 1 | GENRE CATEGORY | | | | | | |

SOURCE CONTROL

Fig. 12

| | MSB | | | | | | | LSB |
|---|---|---|---|---|---|---|---|---|
| PC 0 | 0 | 1 | 1 | 0 | 0 | 0 | 1 | 0 |
| PC 1 | DS | TM | TIME ZONE | | | | | |
| PC 2 | 1 | 1 | DAY | | | | | |
| PC 3 | WEEK | | | MONTH | | | | |
| PC 4 | YEAR | | | | | | | |

REC DATE

Fig. 13

| | MSB | | | | | | | LSB |
|---|---|---|---|---|---|---|---|---|
| PC 0 | 0 | 1 | 1 | 0 | 0 | 0 | 1 | 1 |
| PC 1 | S2 | S1 | TENS of FRAMES | | UNITS of FRAMES | | | |
| PC 2 | S3 | TENS of SECONDS | | | UNITS of SECONDS | | | |
| PC 3 | S4 | TENS of MINUTES | | | UNITS of MINUTES | | | |
| PC 4 | S6 | S5 | TENS of HOURS | | UNITS of HOURS | | | |

REC TIME

Fig. 14

| | MSB | | | | | | | LSB |
|---|---|---|---|---|---|---|---|---|
| PC 0 | 0 | 1 | 1 | 0 | 0 | 1 | 0 | 0 |
| PC 1 | 2nd BINARY | | | | 1st BINARY | | | |
| PC 2 | 4th BINARY | | | | 3rd BINARY | | | |
| PC 3 | 6th BINARY | | | | 5th BINARY | | | |
| PC 4 | 8th BINARY | | | | 7th BINARY | | | |

BINARY GROUP

Fig. 15

| | MSB | | | | | | | LSB |
|---|---|---|---|---|---|---|---|---|
| PC 0 | 0 | 1 | 1 | 0 | 0 | 1 | 0 | 1 |
| PC 1 | 1st FIELD Line 21 Upper BYTE | | | | | | | |
| PC 2 | 1st FIELD Line 21 Lower BYTE | | | | | | | |
| PC 3 | 2nd FIELD Line 21 Upper BYTE | | | | | | | |
| PC 4 | 2nd FIELD Line 21 Lower BYTE | | | | | | | |

CLOSED CAPTION

APPARATUS FOR RECORDING AND/OR REPRODUCING A VIDEO SIGNAL

BACKGROUND OF THE INVENTION

1. Field of the Invention

The present invention relates to an apparatus for recording and/or reproducing a video signal and, more particularly, to such apparatus for recording and/or reproducing a still image and a moving image.

2. Description of the Related Art

A conventional analog type video tape recorder (VTR) integrated camera may include an image pick-up device which receives an image and forms a luminance signal and a chroma signal therefrom. Thereafter, the luminance signal is frequency modulated and the chroma signal is converted to a relatively low frequency signal, afterwhich the signals are recorded onto a magnetic tape. Such analog type VTR integrated camera may produce a picture having relatively poor quality as a result of signal deterioration due to aging, dubbing operations and the like.

To improve the relatively poor picture quality which may result from the analog type VTR integrated camera, a digital type VTR integrated camera having an image pick-up device is being developed. In such digital type VTR integrated camera, a video signal from the image pick-up device is digitized and compressed by a high efficient coding technique and recorded onto a magnetic tape. The digital type VTR integrated camera produces a picture having a relatively good quality which is not significantly deteriorated over time or due to dubbing operations, as compared with the analog type VTR integrated camera previously described.

As is to be appreciated, it may be desirable to supply an output video signal from the digital type VTR integrated camera to a video printer so as to be printed thereat thereby forming a photographed picture plane. It may further be desirable to supply the digital video signal generated by the digital type VTR integrated camera to a computer so as to enable image processing to be performed therein with relative ease. It may still further be desirable to provide a signal representing a moving image from the digital type VTR integrated camera for display on a display device. It may still further be desirable to utilize such digital type VTR integrated camera to provide other desired features such as printing out of a fetched picture plane, formation of computer graphics, and the like, which may not be readily performed by the analog type VTR integrated camera.

However, the above-described conventional digital type VTR integrated camera normally compresses and records a component video signal comprising a luminance signal Y and color difference signals (R-Y) and (B-Y) which may have been band limited. On the other hand, a video printer and a computer are normally constructed so as to process three primary color signals, that is, red (R), green (G), and blue (B). As a result, when such conventional digital type VTR integrated camera supplies a video signal to a video printer so as to printed thereat or to a computer so as to be processed or displayed thereat, a problem such as insufficient color resolution may occur which may be readily apparent.

Thus, it is desirable to have an apparatus for recording and/or reproducing a video signal which enables a still image reproduction (such as when a reproduced video signal is printed by a video printer) and an image display (which may have been processed by a computer) to have a relatively high color resolution.

OBJECTS AND SUMMARY OF THE INVENTION

An object of the present invention is to provide an apparatus for recording and/or reproducing a video signal in which reproductions of a still image as, for example, obtained by a video printer, and a moving image have a relatively high color resolution.

More specifically, it is an object of the present invention to provide an apparatus for recording and/or reproducing a video signal having first and second recording and/or reproducing modes for respectively recording and/or reproducing a moving image and a still image.

Another object of the present invention is to provide an apparatus as aforesaid in which video signals having a luminance signal and two color difference signals are recorded and/or reproduced in the first mode and three primary color (RGB) signals are recorded and/or reproduced in the second mode, and in which the amount of information of each of the three primary color signals is the same or greater than the amount of the information of the luminance signal.

A further object of the present invention is to provide an apparatus as aforesaid in which signal processing in each recording mode and in a reproducing mode can be commonly executed.

In accordance with an aspect of the present invention, a video signal recording apparatus is provided. The apparatus comprises a device for receiving a video signal and for converting the received video signal to a digital video signal; and a recording device having first and second modes for compression coding the digital video signal and for recording the compression coded digital video signal. The recording device is operable in the first mode to record a compression coded digital signal having a luminance signal and two color difference signals and the recording device is operable in the second mode to record a compression coded digital signal having three primary color signals.

In accordance with another aspect of the present invention, a video signal reproducing apparatus is provided. Such apparatus comprises a reproducing device having first and second modes for reproducing a compression coded digital video signal. The reproducing device is operable in the first mode to reproduce a recorded compression coded digital video signal having a luminance signal and two color difference signals and the reproducing device is operable in the second mode to reproduce a recorded compression coded digital video signal having three primary color signals. The apparatus further comprises an output device for receiving the reproduced digital video signal from the reproducing device and for supplying the same therefrom.

The present video signal recording and/or reproducing apparatus may further comprise a shutter key. Upon depressing such shutter key, the second recording or RGB mode is set or activated, whereupon an image or a picture plane of one frame which is being photographed is fetched and recorded as a still image.

Thus, the present video signal recording and/or reproducing apparatus includes a first or YCrCb recording mode for recording a digital video signal having a luminance signal Y and two color difference signals (R-Y) and (B-Y), and further includes a second or RGB recording mode for recording a digital video signal having three primary color RGB signals. Either of the first or second recording modes may be set or activated. A still image may be recorded in the second or RGB recording mode. The color resolution of the still image recorded in such RGB mode is relatively high so that upon reproducing or printing of such recorded still image as, for example, by a video printer, the picture quality thereof is relatively high.

In the present video signal recording and/or reproducing apparatus, a compression coding parameter of each of the three primary color signals in the second recording mode may be set so as to be similar to a compression coding parameter of the luminance signal in the first recording mode. In such situation, each of the three primary color signals may be recorded in a recording area which may be utilized for recording the luminance signal in the first recording mode. Further, when the compression coding parameter of each of the three primary color signals in the second or RGB recording mode is similar to the compression coding parameter of the luminance signal in the first or YCrCb recording mode, processing in the RGB recording mode and the YCrCb recording mode can be commonly executed.

In the present video signal recording and/or reproducing apparatus, the amount of information of each of the three primary color signals of the second or RGB recording mode may be made to correspond to the total amount of information of the luminance signal Y and the two color difference signals (R-Y) and (B-Y) of the first or YCrCb recording mode. In this situation, each of the three primary color signals may be recorded in a recording area which may be utilized for recording the luminance signal and the two color difference signals of the first recording mode. More specifically, the amount of information of the luminance signal in the YCrCb recording mode may be considered as equal to four while the amount of information of each of the two color difference signals may be considered as equal to one. As a result, the amount of information for each of the three primary color signals in the RGB recording mode can be considered to be six. Accordingly, in such situation, the amount of information of each of the three primary color signals in the RGB recording mode is set to a value which is 6/4 times as much as the amount of information of the luminance signal in the YCrCb recording mode. Such amount of information for each of the three primary color signals may be set by increasing the sampling frequency, by changing the compression coding parameter or by other similar such methods. Each of the three primary color signals having an amount of information equal to 6/4 that of the luminance signal in the YCrCb recording mode may be recorded in a recording area which may be utilized for recording of the luminance signal and the two color difference signals in the YCrCb recording mode. As a result, the resolution may be improved.

In the present video signal recording and/or reproducing apparatus, an image may be continuously recorded as a still image a plurality of times in the second recording mode.

In the present video signal recording and/or reproducing apparatus, a plurality of still images of the same image are reproduced from a recording medium to which still image data of the same image had been continuously recorded a plurality of times in the second recording mode so as to produce a still image having no errors.

By continuously recording an image as a still image a plurality of times in the RGB recording mode and by reproducing the still image so as to have no errors, the present apparatus can accommodate a signal drop-out.

The output device of the present video signal recording and/or reproducing apparatus may include a digital interface for supplying therefrom the reproduced digital video signal having the three primary color signals. Such digital interface enables relatively easy connection to a printer or a computer.

Other objects, features and advantages according to the present invention will become apparent from the following detailed description of illustrated embodiments when read in conjunction with the accompanying drawings in which corresponding components are identified by the same reference numerals.

BRIEF DESCRIPTION OF THE DRAWINGS

FIGS. 1A, 1B and 1C are block diagrams of an apparatus for recording and/or reproducing a video signal according to an embodiment of the present invention;

FIG. 10 is a schematic diagram of a pack structure of additional VAUX information referred to as SOURCE;

FIG. 11 is a schematic diagram of a pack structure of additional VAUX information referred to as SOURCE CONTROL;

FIG. 12 is a schematic diagram of a pack structure of additional VAUX information referred to as REC DATA;

FIG. 13 is a schematic diagram of a pack structure of additional VAUX information referred to as REC TIME;

FIG. 14 is a schematic diagram of a pack structure of additional VAUX information referred to as BINARY GROUP; and FIG. 15 is a schematic diagram of a pack structure of additional VAUX information referred to as CLOSED CAPTION.

DETAILED DESCRIPTION OF THE PREFERRED EMBODIMENTS

Figure 1B:
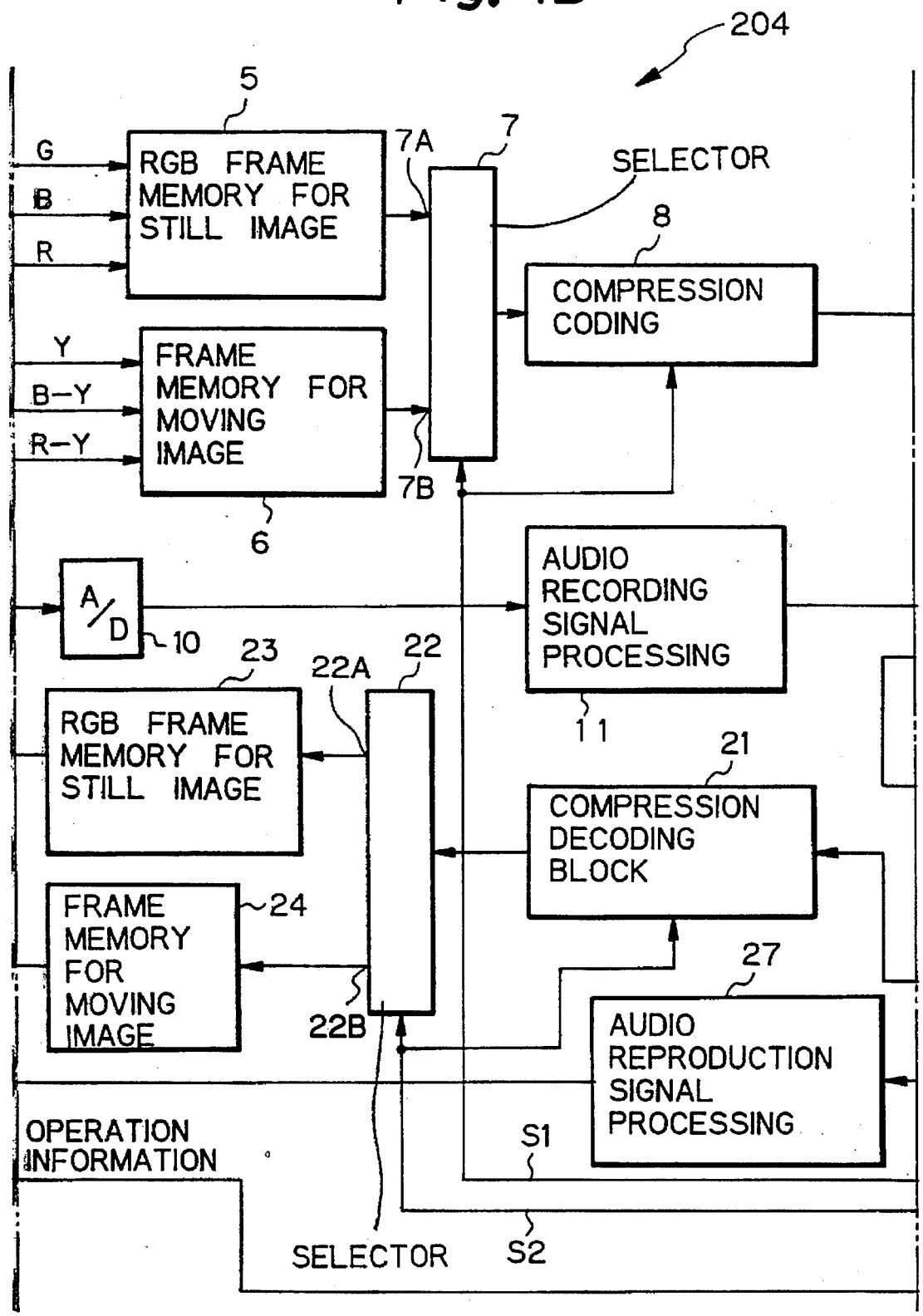

An apparatus for recording and/or reproducing video signals according to an embodiment of the present invention will now be described with initial reference to FIG. 1 which includes FIGS. 1A, 1B and 1C. As shown therein, such apparatus 200, which may be referred to as a digital type VTR integrated camera apparatus, generally includes a recording portion 204 and a reproducing portion 206. The recording portion 204 will be initially described below, afterwhich the reproducing portion 206 will be described.

The recording portion 204 may include a camera 202 or, alternatively, may have such camera coupled thereto. In either situation, the recording portion 204 with the camera 202 generally includes an optical system 1, a charge coupled device (CCD) image pick-up system or device 2, an analog-to-digital converter 3, a camera signal processing circuit 4, frame memories 5 and 6, a selector 7, a compression coding circuit 8, an error correction code adding circuit 12, an additional information generating circuit 41, a channel coding circuit 14, a recording amplifier 15, an input key 31 and a system controller 30, which may be arranged as shown in FIGS. 1A–1C.

Light of an object image is received by the optical system 1 and passed through a lens included therein. Such light is thereafter supplied to the CCD image pick-up system 2 so as to be formed as an image on a photo sensitive surface of the CCD image pick-up device. The CCD image pick-up device 2 is adapted to photoelectrically convert the object image light and to supply corresponding output signals therefrom. Such output signals, which may be three primary color signals R, G, and B, are supplied to the A/D converter 3 so as to be converted to digital RGB signals. The digital RGB signals from the A/D converter 3 are supplied to the camera signal processing circuit 4.

The camera signal processing circuit 4 is adapted to process the received digital RGB signals in a predetermined manner which, for example, may include processing for gamma correction, white balance adjustment, addition of a detail signal, and the like. The RGB signals processed by the camera signal processing circuit 4 are supplied therefrom. The camera signal processing circuit 4 includes a matrix circuit 4A for converting the three primary color RGB digital signals into a luminance signal Y and color difference signals (R-Y) and (B-Y) which are supplied therefrom.

The three primary color signals R, G and B from the camera signal processing circuit 4 are supplied to the frame memory 5, which may have a capacity to store one frame of each of the three primary color signals R, G and B. Such three stored primary color signals R, G and B may be utilized for still image recording as hereinafter more fully described.

The luminance signal Y and the color difference signals (R-Y) and (B-Y) from the camera signal processing circuit 4 are supplied to the frame memory 6 so as to be stored thereat. Such stored luminance signal Y and color difference signals (R-Y) and (B-Y) may be utilized for recording a moving image as hereinafter more fully described. If the amount of information for the luminance signal Y is assumed to have a value of 4, then the amount of information of each of the color difference signals (R-Y) and (B-Y) has a value of 1. In other words, the amount of information or data of the luminance signal Y is approximately four (4) times the amount of data of each of the color difference signals (R-Y) and (B-Y).

The frame memories 5 and 6 may be utilized to divide a signal into blocks when compressing an image.

Output signals of the frame memories 5 and 6 are supplied to the selector 7. The selector 7 further receives a recording mode signal S1 from the system controller 30. In response to such recording mode signal S1, the selector 7 is set to one of terminals 7A or 7B. More specifically, the selector 7 is set so as to receive the RGB signals from the frame memory 5 through the terminal 7A when an RGB recording mode is selected, and the selector 7 is set so as to receive the luminance signal Y and the color difference signals (R-Y) and (B-Y) from the frame memory 6 through the terminal 7B when an YCrCb recording mode is selected. The selector 7 supplies an output signal to the compression coding circuit 8.

The compression coding circuit 8 receives the recording mode signal S1 from the system controller 30 and the output signal from the selector 7. Such output signal from the selector 7 may include the three primary color signals when the RGB recording mode is selected, and alternatively, may include the luminance signal Y and the two color difference signals (R-Y) and (B-Y) when the YCrCb recording mode is selected. The compression coding circuit 8 is adapted to shuffle a received input image signal and may, for example, divide such signal into (8×8) blocks, perform a discrete cosine transformation (DCT) on the signal, quantizes the signal so that a code amount of a predetermined buffer unit is equal to or less than a predetermined amount, and variable length code the signal by utilizing a 2-dimensional Huffman code.

Thus, the luminance signal Y and the color difference signals (R-Y) and (B-Y) are supplied to the compression coding circuit 8 when the YCrCb recording mode is selected, whereupon the luminance signal Y and the color difference signals (R-Y) and (B-Y) are compression coded as described above. On the other hand, the three primary color signals R, G and B are supplied to the compression coding circuit 8 when the RGB recording mode is selected, whereupon the three primary color signals R, G and B are compression coded as described above.

Further, as previously indicated, in the YCrCb recording mode, the amount of information of the luminance signal Y and each of the color difference signals (R-Y) and (B-Y) may be considered as respectively equal to four (4) and one (1). On the other hand, in the RGB recording mode, the amount of information of each of the three primary color signals R, G and B may be set so as to be substantially the same as the amount of information of the luminance signal Y in the YCrCb recording mode. That is, in this situation, each of the three primary color signals R, G and B may be considered as having an amount of information substantially equal to four (4). As a result, each of the three primary color signals R, G and B may be recorded in a recording area or region which may be utilized by the luminance signal Y by utilizing a compression parameter similar to the compression parameter used when the luminance signal Y is compression coded.

Alternatively, in the RGB recording mode, the amount of information of each of the three primary color signals R, G and B may be set so as to be substantially equal to the amount of information of the luminance signal Y and the two color difference signals (R-Y) and (B-Y) of the YCrCb recording mode. In other words, in this situation, the amount of information of each of the three primary color signals R, G and B may be considered as being equal to "6", that is, "4" of the luminance signal Y and "1" of each of the color difference signals (R-Y) and (B-Y) of the YCrCb recording mode. Thus, in this situation, the amount of information of each of the three primary color signals R, G and B is approximately 6/4 times as much as the amount of information of the luminance signal Y in the YCrCb recording mode. To obtain or set the amount of information of each of the three primary color signals R, G and B to such value that is 6/4 times as much as that of the luminance signal Y, a quantization parameter having a relatively high accuracy which is approximately 6/4 times as high as that of the compression parameter used when the luminance signal Y is compression coded is utilized or, alternatively, the sampling frequency is increased by approximately 6/4 times. Further, in such situation, the three primary color signals R, G, and B may be recorded by using the recording regions or areas which may be utilized by the luminance signal Y and the color difference signals (R-Y) and (B-Y) in the YCrCb recording mode.

Although in describing the RGB recording mode, the amount of information of each of the three primary color signals R, G and B was described as either equal to or 6/4 times the amount of information of the luminance signal Y of the YCrCb mode, the present invention is not so limited. That is, the amount of information in such three primary color signals may have other values, such as those which are larger than the amount of information of the luminance signal Y.

An output signal from the compression coding circuit 8 is supplied to the error correction code adding circuit 12. More specifically, the compressed three primary color signals R, G and B are supplied from the compression coding circuit 8 to the error correction code adding circuit 12 in the RGB recording mode, and the compressed luminance signal Y and color difference signals (R-Y) and (B-Y) are supplied from the compression coding circuit to the error correction code adding circuit in the YCrCb recording mode.

The error correction code adding circuit 12 may further receive additional information from the additional information generating circuit 41. Such additional information, which may include VAUX, AAUX, and the like as will be hereinafter more fully described, is generated from the addition information generating circuit 41 in accordance with information received from the system controller 30. The additional information may further include information indicating whether the recording mode is the YCrCb recording mode or the RGB recording mode. More specifically, as hereinafter more fully described, the information indicating whether the recording mode is a YCrCb recording mode or RGB recording mode is written in a portion of the VAUX referred to as a signal type STYPE in PC3 of SOURCE (see FIG. 10). Further, information indicating whether the image is a still image or not is written in a still image flag ST in PC3 of SOURCE CONTROL of the VAUX (see FIG. 11), as will be more fully explained hereinafter.

Referring back to FIG. 1A, the recording portion 204 may further include a microphone 9 which is adapted to collect an audio sound. An output audio signal from the microphone 9 is supplied to an analog-to-digital (A/D) converter 10 so as to be converted to a digital audio signal. Such digital audio signal from the A/D converter 10 is supplied to an audio recording signal processing circuit 11, whereupon such received digital audio signal may be subjected to an interleaving process or the like. The processed digital audio signal from the audio recording signal processing circuit 11 is supplied to the error correction code adding circuit 12.

Thus, the error correction code adding circuit 12 may receive output signals from the compression circuit 8, the additional information generating circuit 41 and the audio recording signal processing circuit 11. The error correction code adding circuit 12 is adapted to add an error correction code and also SYNC, ID, and additional information to the video signal, audio signal and subcode which are to be recorded.

An output of the error correction code adding circuit 12 is supplied to the channel coding circuit 14, wherein the data to be recorded is modulated. An output signal of the channel coding circuit 14 is supplied to the recording amplifier 15 so as to amplified, whereupon the amplified data is supplied to a rotary head of a tape transfer system 16 through a rotary transformer (not shown).

Thus, as previously described, the present recording portion 204 of the apparatus 200 may be set to record in either a YCrCb recording mode or a RGB recording mode. That is, a video signal comprising a luminance signal Y and color difference signals (R-Y) and (B-Y) may be compressed and recorded in the YCrCb recording mode, and a video signal comprising three primary color signals R, G and B may be compressed and recorded in the RGB recording mode.

To set the recording mode of the recording portion 204 to one of the YCrCb recording mode or the RGB recording mode, the input key 31 is utilized. As shown in FIG. 1A, such input key 31 includes a recording start key 31A and a shutter key 31B which, upon depressing or activating, respectively initiates or sets the YCrCb recording mode and the RGB recording mode. That is, upon depressing the recording start key 31A, the YCrCb recording mode is set. As a result, a moving image may be recorded which is represented by a video signal comprising a luminance signal Y and color difference signals (R-Y) and (B-Y). Upon depressing the shutter key 31B, the RGB recording mode is set. As a result, a still image may be recorded which is represented by three primary color signals of R, G and B.

An output or operational information signal from the input key 31, which indicates which of the recording start key 31A and the shutter key 31B has been depressed, is supplied to the system controller 30. Based upon such operational information, the system controller 30 generates the recording mode signal S1. As previously described, such recording mode signal S1 is supplied from the system controller 30 to the compression coding circuit 8 and the selector 7, whereupon the selector is set to the terminal 7A side in the RGB recording mode and is set to the terminal 7B side in the YCrCb recording mode.

The reproduction portion 206 of the apparatus 200 will now be described.

Figure 1C:
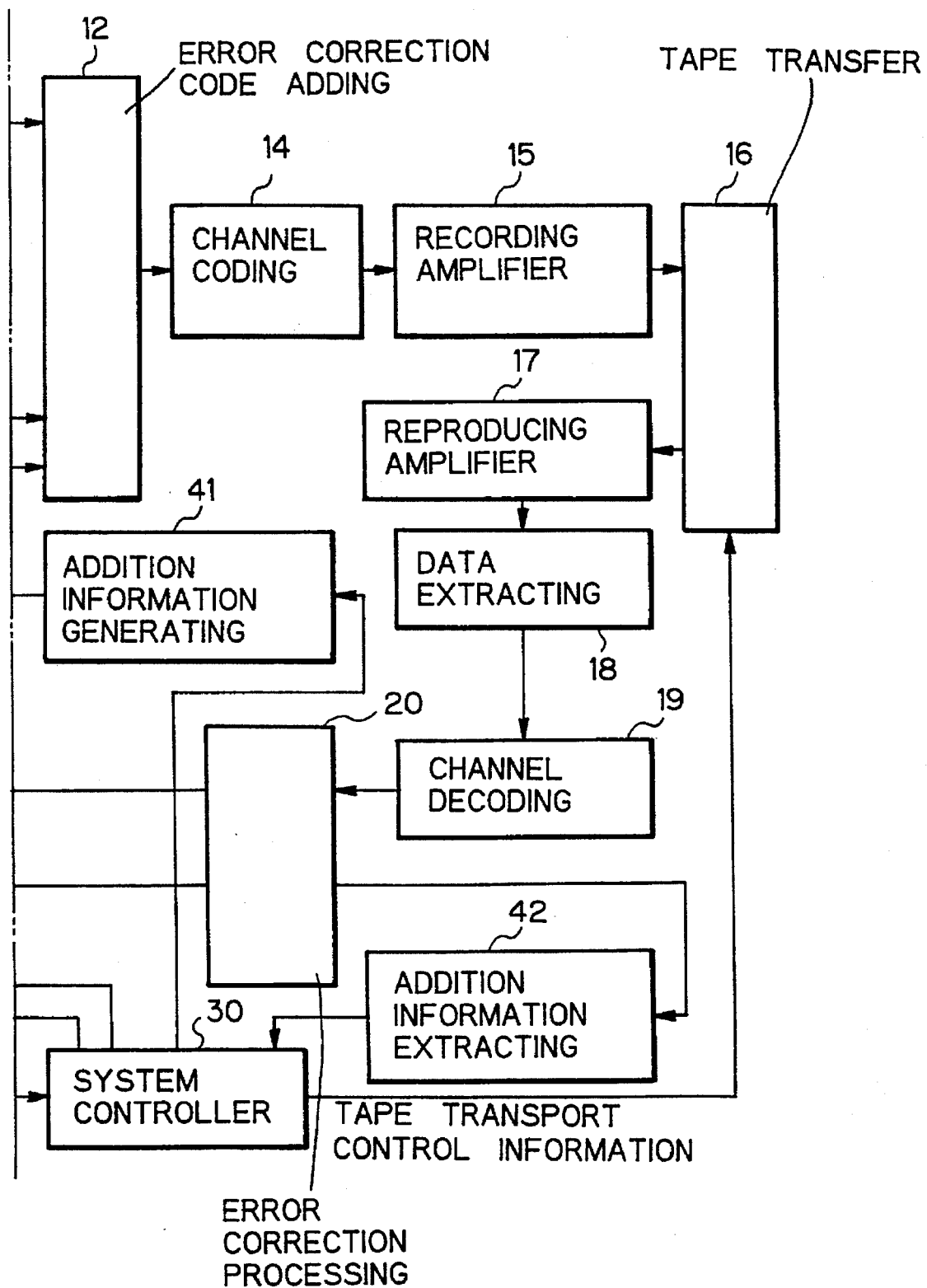

The reproduction portion 206 generally includes a reproducing amplifier 17, a data extracting circuit 18, a channel decoding circuit 19, an error processing circuit 20, an additional information extracting circuit 42, a compression decoding block circuit 21, the system controller 30, an audio reproduction signal processing circuit 27, a selector 22, frame memories 23 and 24, a still image data output interface 32, and an output signal selector 25, which are arranged as shown in FIGS. 1A–1C.

A signal reproduced by the rotary head of the tape transfer system 16 is supplied through the rotary transformer to the reproducing amplifier 17 so as to amplify the reproduced signal. The amplified reproduced signal from the reproducing amplifier 17 is supplied to the data extracting circuit 18, whereupon a clock signal of the reproduction system is extracted. An output signal from the data extracting circuit 18 is supplied to the channel decoding circuit 19 which is adapted to demodulate the received reproduction signal.

An output signal from the channel decoding circuit 19 is supplied to the error correction processing circuit 20 which is adapted to perform error correction processing of data of the reproduction signal. An output signal of the error correction processing circuit 20 is supplied to the additional information extracting circuit 42, whereupon additional information is extracted from the reproduction data. The extracted additional information from the additional information extracting circuit 42 is supplied to the system controller 30.

As previously described, the additional information may include information (for example, the signal type STYPE) indicating whether the mode utilized to record the current reproduced data was the YCrCb recording mode 0r the RGB recording mode. Based upon such information, a reproduction mode signal S2 is generated by the system controller 30 and supplied therefrom to the compression decoding block circuit 21 and the selector 22 so as to control the same. More specifically, when the reproduced additional information indicates that the reproduction signal has been recorded in the RGB recording mode, the reproduction mode signal S2 causes the selector 22 to be set to a terminal 22A side and further causes a parameter of a compression decoding circuit 21 to be set in accordance therewith. On the other hand, when the reproduced additional information indicates that the reproduction signal has been recorded in the YCrCb recording mode, the reproduction mode signal S2 causes the selector 22 to be set to a terminal 22B side and further causes a parameter of a compression decoding circuit 21 to be set in accordance therewith.

A reproduced compression video signal from the error correction processing circuit 20 is supplied to the compression decoding block circuit 21, whereupon the received video signal is processed in a predetermined manner, which may include decoding of a variable length code, inverse quantization, inverse DCT, or the like, and the compression code is decoded. As a result of such processing, a signal having either the three primary color signals R, G and B or the luminance signal Y and the color difference signals (R-Y) and (R-B) is formed and supplied therefrom. That is, when a signal recorded in the RGB recording mode is reproduced, three primary color signals R, G and B are formed and supplied from the compression decoding circuit 21, and when a signal recorded in the YCrCb recording mode is reproduced, a luminance signal Y and color difference signals (R-Y) and (B-Y) are formed and supplied from the compression decoding circuit. The output from the compression decoding circuit 21 is supplied to the selector 22.

As previously described, the selector 22 receives the reproduction mode signal S2 from the system controller 30 and, in response thereto, is set to the appropriate one of the terminal sides 22A and 22B. As a result, when a signal recorded in the RGB recording mode is reproduced, the selector 22 is set to the terminal 22A side so that the three primary color signals R, G and B from the compression decoding circuit 21 are supplied to the frame memory 23. Such frame memory 23 is adapted to execute a block combining process so as to combine the 8×8 blocks which were divided during recording in the RGB recording mode. On the other hand, when a signal recorded in the YCrCb recording mode is reproduced, the selector 22 is set to the terminal 22B side so that the luminance signal Y and the color difference signals (R-Y) and (B-Y) from the compression decoding circuit 21 are supplied to the frame memory 24. Such frame memory 24 is adapted to execute a block combining process so as to combine the 8×8 blocks which were divided during recording in the YCrCb recording mode.

When a signal recorded in the RGB recording mode is being reproduced, three primary color signals R, G and B from the frame memory 23 are supplied to the still image data output interface 32 and to a terminal 25A side of the output signal selector 25. The still image data output interface 32 may be utilized for digitally transferring still image data to a computer, a printer, or the like. During such reproduction of a signal recorded in the RGB recording mode, the output signal selector 25 is set to the terminal 25A side so as to receive the three primary color signals R, G and B from the frame memory 23. An output signal from the output signal selector 25 is supplied to a digital-to-analog (D/A) converter 26 so as to be converted to an analog signal. An output signal from the D/A converter 26 is supplied to a video output terminal 43 so as to be output from the reproducing portion 206.

On the other hand, when a signal recorded in the YCrCb recording mode is being reproduced, a luminance signal Y and color difference signals (R-Y) and (B-Y) from the frame memory 24 are supplied to a terminal 25B side of the output signal selector 25. During such reproduction of a signal recorded in the YCrCb recording mode, the output signal selector 25 is set to the terminal 25B side so as to receive the signals from the frame memory 24. As in the above-described RGB reproduction mode, the output of the output signal selector 25 is supplied to the D/A converter 26 so as to be converted into an analog signal, and the output therefrom is supplied to the video output terminal 43 so as to be output therefrom.

Various types or kinds of signals, such as, an RGB signal, a Y/C separate video signal, a composite video signal, a luminance signal Y and color difference signals (R-Y) and (B-Y), and the like may be supplied from the output terminal 43. Accordingly, in the present apparatus, such output terminal may be arranged so as to accommodate the specifications and systems pertaining to the respective type of signal to be supplied from the output terminal 43.

The error correction processing circuit 20 further supplies a reproduced audio signal, which has been processed therein for error correction, to the audio reproduction signal processing circuit 27. Such audio reproduction signal processing circuit 27 is adapted to process the reproduced error corrected audio signal in accordance with a deinterleaving process or the like. An output signal from the audio reproduction signal processing circuit 27 is supplied to a digital-to-analog (D/A) converter 28 so as to be converted to an analog audio signal. The analog audio signal from the D/A converter 28 is supplied to an audio output terminal 45 so as to be supplied from the reproducing portion 206.

Therefore, in the present apparatus, either a YCrCb recording mode or a RGB recording mode may be set as previously described. In such RGB recording mode, the amount of information of each of the three primary color signals R, G and B can be set to a value that is approximately 6/4 times as much as the amount of information of the luminance signal Y in the YCrCb recording mode. Thus, by changing the quantization parameter or by raising the sampling frequency of the three primary color signals R, G and B, the horizontal resolution can be increased or improved so that a photographed picture plane printed out by a printer or the like may have a relatively high color resolution.

Furthermore, in the YCrCb recording mode, the image of one frame may be recorded in a predetermined number of tracks, for example, 10 tracks. In the RGB recording mode, each image of one frame for each of the three primary color signals R, G and B may be recorded in a predetermined number of tracks, such as 10 tracks, so that the image of one frame is recorded in 30 tracks. By continuously recording the same picture plane a plurality of times when a still image is recorded in the RGB recording mode, the present apparatus may accommodate a signal drop-out which may occur during reproduction. That is, by utilizing such plurality of recorded picture planes and by detecting an error, such as a signal drop-out, during reproduction, the present apparatus may provide a reproduced signal for a picture plane of a frame without an error.

A recording format which may be utilized by the present digital type VTR integrated camera apparatus will now be described.

Figure 2:
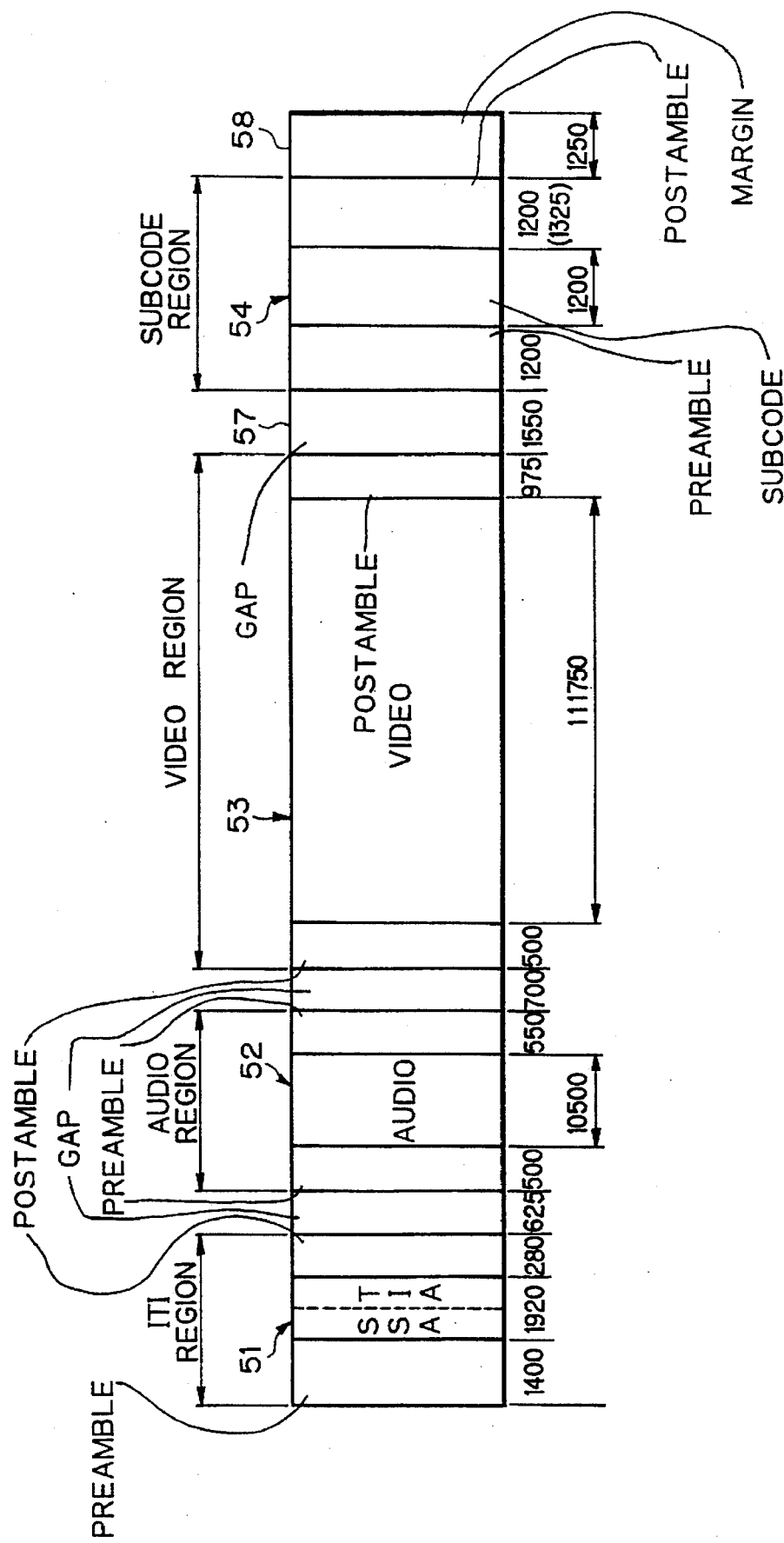
FIG. 2 is a schematic diagram of a recording format of a track which may be utilized by the apparatus of FIG. 1.

FIG. 2 illustrates a format of one track which may be utilized by the present digital type VTR integrated camera apparatus for recording data. As shown therein, such format generally includes an insert and track information (ITI) region 51, an audio region 52, a video region 53, and a subcode region 54 which are separated by respective gap portions and which are sequentially arranged from the entrance side of the respective track. The gap portions are adapted to accommodate timing errors or the like which may occur during processing of the signals, such as the editing thereof. The number of bits included within each portion of these regions is identified in FIG. 2.

The ITI region 51 is a timing block which is adapted to provide accurate positioning information of the data information recorded in the respective track after such recording. Such ITI region 51 includes a preamble portion for a line of PLL or the like, a start-sync block area (SSA) portion which is utilized for positioning after recording and may be utilized for obtaining a reference signal during an insert editing mode or the like, a track information area (TIA) portion which includes an application ID (APT) of three bits for specifying a data structure of a track and the like and may be utilized to determine the arrangement of the regions or sectors excluding the ITI region, and a postamble portion.

Figure 3A:
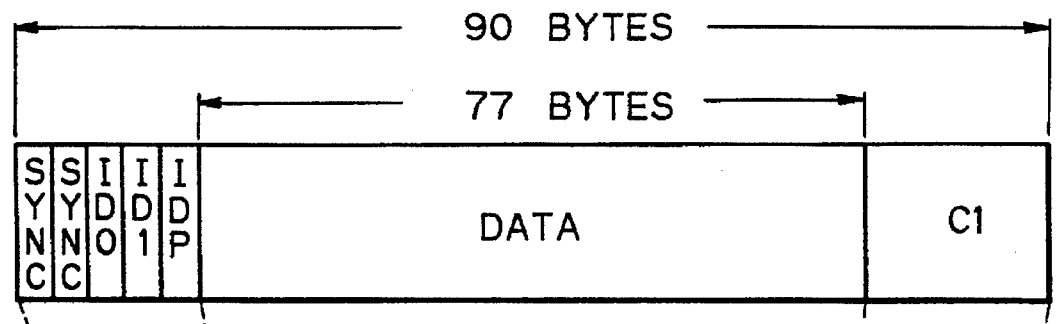
FIGS. 3A and 3B are schematic diagrams of an audio portion of the recording format of FIG. 2.
Figure 3B:
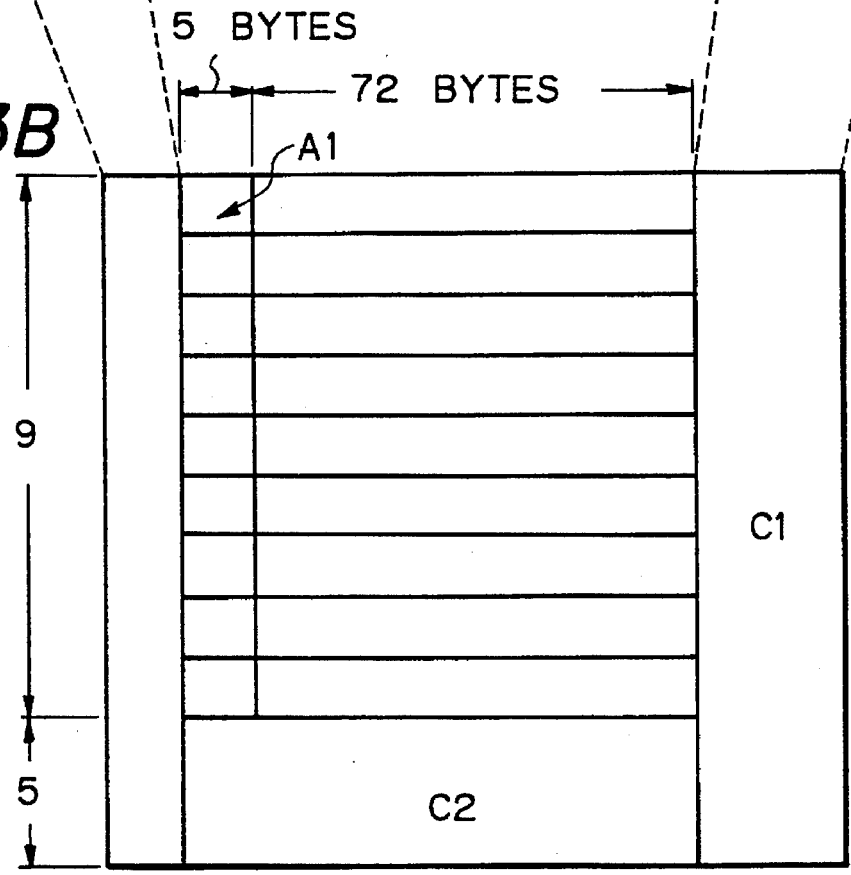

The audio region 52 includes a preamble portion, an audio data portion, and a postamble portion. The audio data may have a structure as shown in FIGS. 3A and 3B. As shown therein, such structure includes nine blocks each having a data length of 77 bytes arranged in a vertical direction and parities C1 and C2 arranged in the vertical and horizontal directions. At the head portion of each of the nine blocks, portions identified as SYNC, SYNC, ID0, ID1, and IDP are arranged. The IDP portion includes parity information for protecting the ID0 and ID1 portions. Five bytes of the former half portion in the data section is used for audio auxiliary data (AAUX) for an audio signal. As will be more fully described hereinafter, the AAUX may have a pack structure containing five bytes. The SYNC number of the respective track may be stored in the ID1 portion. An application ID AP1 utilized for deciding a structure of the audio region may be recorded in the upper three bits of the SYNC blocks of a pre-SYNC, a post-SYNC, and the C2 parity in the ID0 portion. A sequence number may be recorded in the upper four bits of the ID0 portion of the other SYNC block.

Figure 4A:
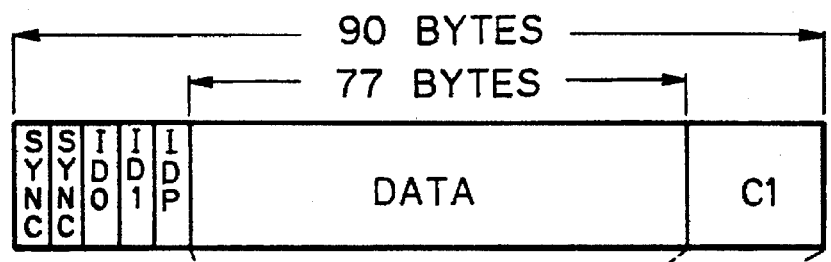
FIGS. 4A and 4B are schematic diagrams of a video portion of the recording format of FIG. 2.
Figure 4B:
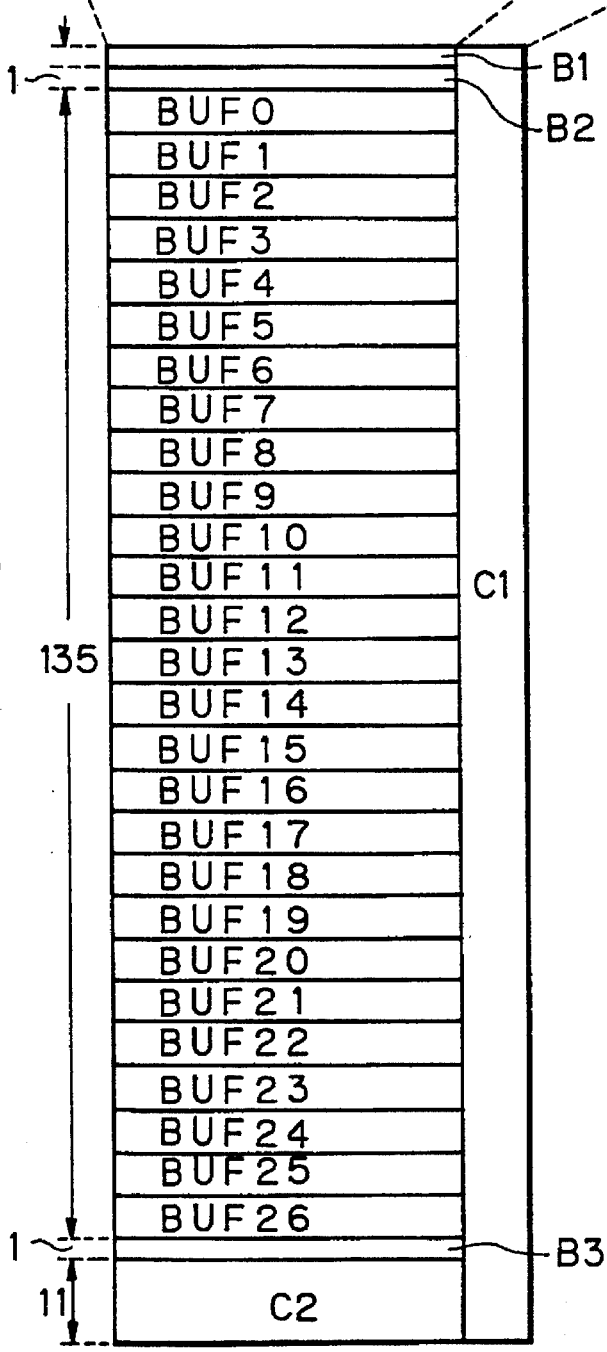

The video region 53 includes a preamble portion, a video data portion, and a postamble portion. The video data may be structured as shown in FIGS. 4A and 4B. As shown therein, such structure includes 27 buffering units identified as BUF0 to BUF26. Each buffering unit or block has 77 bytes of data. Such structure further includes SYNC portions, an ID0 portion, an ID1 portion, an IDP portion, a horizontal parity C1 and a vertical parity C2, and two SYNC blocks B1 and B2 located in the upper portion of the 27 buffering units and arranged in a vertical direction and one SYNC block B3 located adjacent to the C2 parity which may be utilized for video auxiliary data (VAUX) of the video signal. Such VAUX data may include information indicating the current recording mode, that is, whether such recording mode is the RGB mode or the YCrCb. Compressed video data may be recorded in the blocks other than the SYNC blocks for VAUX data. Such video data, as previously described, includes data corresponding to three primary color signals R, G and B when recording in the RGB recording mode and includes data corresponding to a luminance signal Y and color difference signals (R-Y) and (B-Y) when recording in the YCrCb recording mode. An application ID AP2 is recorded in the upper three bits of the pre-SYNC, post-SYNC, and an ID0 portion of the SYNC block of the parity C2. A sequence number is recorded in the upper bits of the ID0 portion of the other SYNC block.

Figure 5:
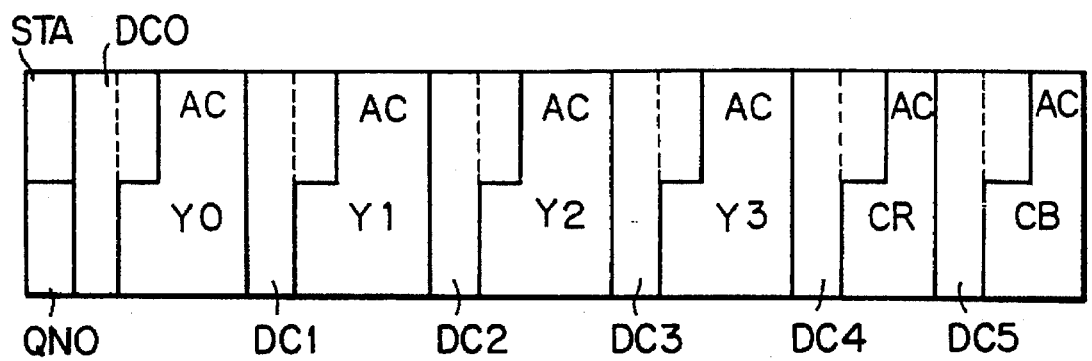
FIG. 5 is a schematic diagram to which reference will be made in explaining the recording of a luminance signal and two color difference signals.
Figure 6:
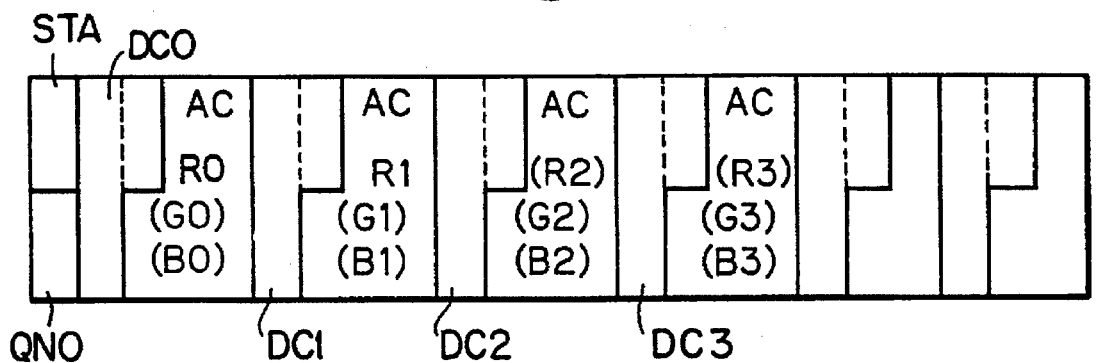
FIG. 6 is a schematic diagram to which reference will be made in explaining the recording of three primary color signals when the amount of information of each such signals is substantially the same as that of a luminance signal.
Figure 7:
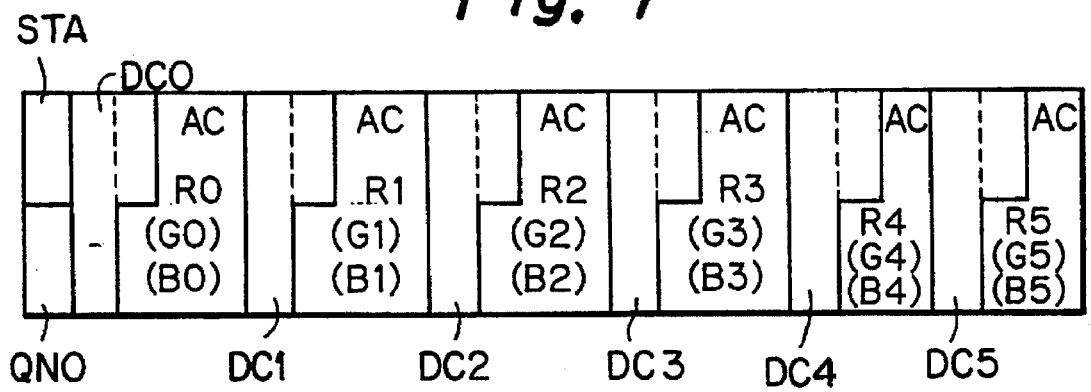
FIG. 7 is a schematic diagram to which reference will be made in explaining the recording of three primary color signals when the amount of information of each such signals is approximately 6/4 that of a luminance signal.

FIGS. 5 to 7 illustrate arrangements of the video data in the buffering units BUF0–BUF26 of FIGS. 4A and 4B. FIG. 5 illustrates the arrangement of the buffering unit for the situation in which the luminance signal Y and the color difference signals (R-Y) and (B-Y) have been recorded in the YCrCb recording mode. In such situation as previously described, the amount of information of each of the color difference signals (R-Y) and (B-Y) may be considered as equal or set to "1", while the amount of information of the luminance signal Y may be considered as equal or set to "4". As shown in FIG. 5, the head portion of the buffering unit includes information STA which may be utilized for error and concealment processing and a quantization table number QNO which may be utilized during quantization processing. Compressed luminance signal data Y0 to Y3, compressed color difference (R-Y) signal data CR, and compressed color difference (B-Y) data CB are arranged as shown in FIG. 5. More specifically, each of the compressed video data is sequentially zigzag scanned from the low frequency component and read out, whereupon D/C data is arranged in the head portion of each of the video data Y0 to Y3, CR, and CB and, thereafter, A/C data is sequentially arranged from the data of the low frequency component.

As previously described, in the RGB recording mode, the amount of information of each of the three primary color signals may be set so as to be equal to or approximately 1½ times the amount of information of the luminance signal Y. FIG. 6 illustrates a data arrangement of the RGB recording mode when the amount of information of each of the three primary color signals R, G and B is equalized with the amount of information of the luminance signal Y in the YCrCb recording mode. In this situation, compressed data (R0 to R3) or (G0 to G3) or (B0 to B3) of each of the three primary color signals may be arranged as shown in FIG. 6. As further shown in FIG. 6, the information STA regarding the error processing and the quantization table number QNO are arranged in the head portion of the buffering unit. FIG. 7 illustrates a data arrangement of the RGB recording mode when the amount of information of each of the three primary color signals R, G and B is set to a value which is 6/4 times the amount of information of the luminance signal Y in the YCrCb recording mode. In this situation, compressed data (R0 to R5) or (G0 to G5) or (B0 to B5) of each of the three primary color signals may be arranged as shown in FIG. 7. As further shown in FIG. 7, the information STA regarding the error processing and the quantization table number QNO are arranged in the head portion of the buffering unit.

Figure 8:
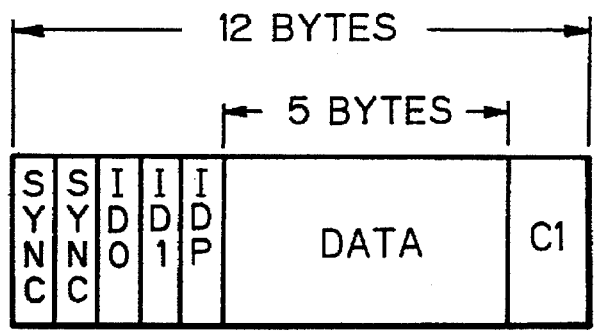
FIG. 8 is a schematic diagram of a subcode portion of the recording format of FIG. 2.
Figure 9A:
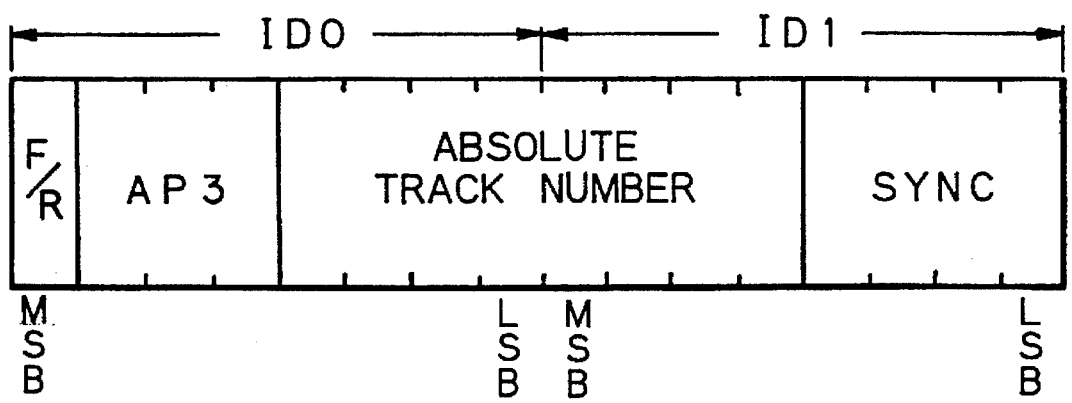
FIGS. 9A and 9B are schematic diagrams of portions of the subcode portion of FIG. 8.
Figure 9B:
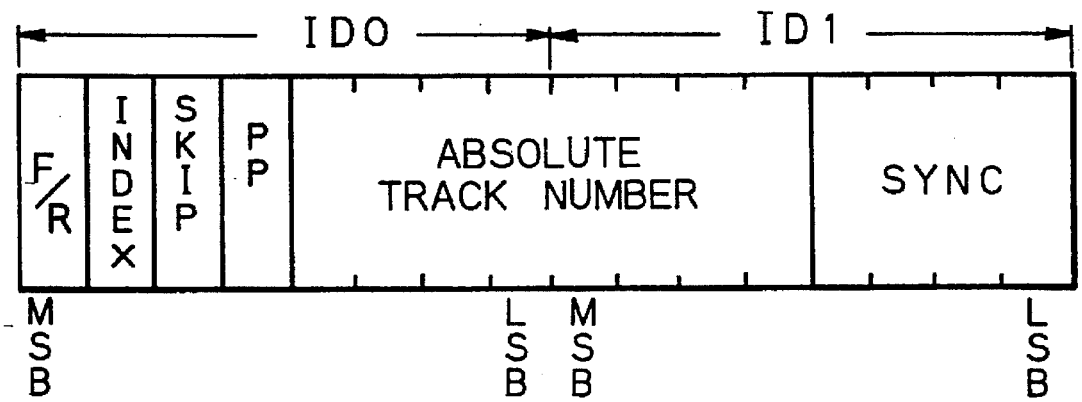

Referring back to FIG. 2, the subcode region includes a preamble portion, a subcode portion, and a postample portion. As shown in FIG. 8, data in the subcode region has five bytes and only a horizontal parity C1 is utilized. These five bytes may have a pack structure similar to that of the VAUX or AAUX. The data portion of the subcode region may have recorded therein a time code having year/month/date and the like information. Further, SYNC, ID0, ID1 and IDP portions are arranged in the head portion of the subcode data. The IDP portion is a parity adapted to protect the ID0 and ID1 portions. As shown in FIG. 9A, an F/R flag may be provided at the MSB of the ID0 portion so as to determine or discriminate whether it is the former half portion or the latter half portion at the time of a variable speed reproduction or a high speed reproduction. An application ID AP3 adapted for deciding the structure of the subcode region may be recorded in the SYNC blocks whose numbers are "0" and "6". INDEX ID, SKIP ID, PP ID (Photo Picture ID) information may be stored in the other SYNC blocks as shown in FIG. 9B. INDEX ID may be utilized for an index search, SKIP ID may be utilized to cut out an unnecessary scene, and PP ID may be utilized to search a still image. Absolute track numbers are written in the ID0 and ID1 portions.

As shown in FIG. 2, an overwrite margin portion is adjacent to the postamble portion of the subcode region 54.

The additional information VAUX of the video signal will now be described. Such video auxiliary data (VAUX) may have a pack structure having five packs PC0–PC5 and five bytes as shown in FIGS. 10 to 15. A head pack PC0 is a header portion and may be divided into an upper four bits and a lower four bits, and the remaining four packs PC1–PC4 have four bytes of data.

FIG. 10 illustrates a pack referred to as "SOURCE" which is identified or defined when the upper and lower four bits of the PC0 are equal to "0110" and "0000", respectively. The digits, in terms of ones and tens, of the television channel are written in PC1. PC2 includes a black and white flag B/W, a color frame enable flag EN, a color frame ID code CLF, and the digits in terms of hundreds of the television channel. PC3 includes a source number SOURCE CODE of the input video signal, a 50/60 flag, and a video signal type STYPE. The video signal type STYPE, along with the 50/60 flag, may be utilized to discriminate between numerous systems, such as, between the high definition (HD) system having a field frequency of 50 Hz or the HD system having a field frequency of 60 Hz, and between the PAL system or the NTSC system. The video signal type STYPE may be further utilized to discriminate whether the signal or image has been recorded in the YCrCb mode wherein a luminance signal Y and color difference signals (R-Y) and (B-Y) are recorded or in the RGB mode wherein three primary color signals R, G and B are recorded. A tuner category (TUNER CATEGORY) having area numbers representing areas of Europe, Africa, North and South America, Asia and Oceania areas, and the like, and a satellite number may be written in PC4.

FIG. 11 illustrates a pack referred to as "SOURCE CONTROL" which is identified or defined when the upper and lower four bits of PC0 are equal to "0110" and "0001", respectively. As shown in FIG. 11, PC1 is reserved. PC2 includes data indicative of a recording start point (REC ST), data indicative of a recording mode (REC MODE), and display mode data DISP which is indicative of an aspect ratio or the like of the display. PC3 includes a frame and field flag FF which may indicate whether two fields or only one field is supplied during one frame period, a first/second flag FS which indicates the field being supplied, a frame change flag FC which indicates whether the picture of the current frame is the same picture of the immediate previous frame, an interlace flag IL which indicates whether the data of two fields Which form one frame is interlaced or non-interlaced, a still image or picture flag ST, a still camera flag SC which indicates whether the current data is a still camera picture or not, and broadcasting system BCSYS information. The still image flag ST may be used to indicate whether a still image was recorded in the RGB mode or a moving image was recorded in the YCrCb recording mode. Data pertaining to the type or category of information contained within the current signal data (such as, fantasy, fashion, mystery and so forth) is included in a portion referred to as GENRE CATEGORY.

FIG. 12 illustrates a pack referred to as "REC DATA" which is identified or defined when the upper and lower four bits of PC0 are equal to "0110" and "0010", respectively. PC1 includes data indicative of Daylight Savings Time (DS), data indicative of a 30-minute time differential from GMT (TM), and data indicative of the time zone (TIME ZONE). The date of the respective recording is written in PC2, the day of the week and month of such recording are written in PC3, and the year of such recording is written in PC4.

FIG. 13 illustrates a pack referred to as "REC TIME" which may be identified or defined when the upper and lower four bits of PC0 are equal to "0110" and "0011", respectively. The frame number, in terms of tens and units, is written in PC1. The recording time, in terms of tens and units of seconds, is written in PC2. The recording time in terms of tens and units of minutes and tens and units of hours are respectively written in PC3 and PC4. Further, S1 to S6 denote flags of a vertical interleave time code and a linear time code format and when this pack is not used, PCO may be set to FFH.

FIG. 14 illustrates a pack referred to as "BINARY GROUP" which may be identified or defined when the upper and lower four bits of PC0 are equal to "0110" and "0100", respectively. When this pack is used, the flags of S1 to S6 are set on the basis of an SMPTE/EBU time code format and when this pack is not used, PCO may be set to FFh.

FIG. 15 illustrates a pack referred to as "CLOSED CAPTION" which may be identified or defined when the upper and lower four bits of PC0 are equal to "0110" and "0101", respectively. Titles may be written into this pack by using the vertical blanking period.

With regard to the above recording format described in conjunction with FIGS. 2–15, reference is made to U.S. application Ser. No. 08/159,554 filed on Dec. 1, 1993 and to U.S. application Ser. No. 08/291,540 filed on Aug. 16, 1994 which are both hereby incorporated by reference.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. A video signal recording apparatus comprising:
   means for receiving a video signal and for converting the received video signal to a digital video signal;
   recording means having first and second modes for compression coding said digital video signal and for recording the compression coded digital video signal, said recording means being operable in said first mode to record a compression coded digital signal having a luminance signal and two color difference signals and said recording means being operable in said second mode to record a compression coded digital signal having three primary color signals; and
   a shutter key adapted to activate said second mode,
   wherein an image represented by a current digital video signal is recorded as a still image when said shutter key activates said second mode.

2. A video signal recording apparatus comprising:
   means for receiving a video signal and for converting the received video signal to a digital video signal; and
   recording means having first and second modes for compression coding said digital video signal and for recording the compression coded digital video signal, said recording means being operable in said first mode to record a compression coded digital signal having a luminance signal and two color difference signals and said recording means being operable in said second mode to record a compression coded digital signal having three primary color signals, in which a compression coding parameter of each of said three primary color signals of said second mode is similar to a compression coding parameter of said luminance signal of said first mode so that each of said three primary color signals of said second mode has an amount of information which corresponds to the amount of information of said luminance signal of said first mode.

3. A video signal recording apparatus comprising:

means for receiving a video signal and for converting the received video signal to a digital video signal; and recording means having first and second modes for compression coding said digital video signal and for recording the compression coded digital video signal, said recording means being operable in said first mode to record a compression coded digital signal having a luminance signal and two color difference signals and said recording means being operable in said second mode to record a compression coded digital signal having three primary color signals, wherein an amount of information of each of said three primary color signals of said second mode corresponds to the amount of information of said luminance signal and said two color difference signals of said first mode, and wherein each of said three primary color signals is recorded in a recording area utilized for recording said luminance signal and said two color difference signals.

4. A video signal recording apparatus comprising:

means for receiving a video signal and for converting the received video signal to a digital video signal; and recording means having first and second modes for compression coding said digital video signal and for recording the compression coded digital video signal, said recording means being operable in said first mode to record a compression coded digital signal having a luminance signal and two color difference signals and said recording means being operable in said second mode to record a compression coded digital signal having three primary color signals, wherein said recording means continuously records an image as a still image a plurality of times when operating in said second mode.

5. A video signal reproducing apparatus comprising:

reproducing means having first and second modes for reproducing a compression coded digital video signal, said reproducing means being operable in said first mode to reproduce a recorded compression coded digital video signal having a luminance signal and two color difference signals and said reproducing means being operable in said second mode to reproduce a recorded compression coded digital video signal having three primary color signals; and output means for receiving the reproduced digital video signal from said reproducing means and for supplying the same therefrom, wherein said reproducing means reproduces in said second mode a plurality of still images representing one image from a recording medium which had been recorded thereon a plurality of times so as to produce a reproduced still image having no errors.

6. A video signal reproducing apparatus comprising:

reproducing means having first and second modes for reproducing a compression coded digital video signal, said reproducing means being operable in said first mode to reproduce a recorded compression coded digital video signal having a luminance signal and two color difference signals and said reproducing means being operable in said second mode to reproduce a recorded compression coded digital video signal having three primary color signals; and output means for receiving the reproduced digital video signal from said reproducing means and for supplying the same therefrom, said output means including a digital interface for supplying therefrom the reproduced digital video signal having said three primary color signals.

7. A video signal recording apparatus comprising:

means for receiving digital video signals;

means for processing the received digital video signals so as to form first and second sets of signals in which said first set includes a luminance signal and two color difference signals and said second set includes three primary color signals;

means for selecting one of said first and second sets of signals;

means for compressing the signals of the selected set so as to form compressed video signals, said compressing means including means for processing each of said three primary color signals of said second set such that each of said three color signals has an amount of information which is at least the same as the amount of information of said luminance signal of said first set; and means for recording said compressed video signals.

8. A video signal recording apparatus according to claim 7, wherein the amount of information of each of the three processed primary color signals is approximately one and one half (1½) times the amount of information of said luminance signal of said first set.

9. A video signal recording apparatus according to claim 7, wherein the amount of information of each of the three processed primary color signals is substantially equal to the amount of information of said luminance signal and said two color difference signals of said first set.

10. A video signal processing apparatus comprising:

selecting means for selecting a first video signal having a luminance signal and two color difference signals or a second video signal having three primary color signals;

coding means for coding the selected first video signal in response to a first coding parameter or for coding the selected second video signal in response to a second coding parameter; and controlling means coupled to said selecting means and said coding means for controlling a value of said first coding parameter or said second coding parameter so that an amount of information of the coded first video signal corresponds to an amount of information of the coded second video signal.

11. A video signal reproducing apparatus comprising:

means for reproducing recorded compression coded video signals from a recording medium;

means for decoding the reproduced video signals;

determining means for determining whether the reproduced video signals were recorded in a first recording mode, in which a video signal having a luminance signal and two color difference signals were recorded, or in a second recording mode, in which a video signal having three primary color signals were recorded, and for supplying therefrom an output signal corresponding to such determination;

selecting means receiving the decoded reproduced video signals and, in response to said output signal from said determining means, for supplying said decoded reproduced video signals to one of first and second outputs; and first and second processing means respectively coupled to said first and second outputs of said selecting means for respectively processing said decoded reproduced video signals in a first manner and a second manner.

12. A video signal reproducing apparatus comprising:

means for reproducing recorded compression coded video signals from a recording medium;

means for decoding the reproduced video signals;

determining means for determining whether the reproduced video signals include three primary color signals or a luminance signal and two color difference signals and for supplying therefrom an output signal corresponding to such determination;

first and second processing means for respectively processing the decoded reproduced video signals in a first manner and a second manner; and selecting means for supplying said decoded reproduced video signals to one of said first and second processing means in response to said output signal from said determining means.

* * * * *